(12) United States Patent
Mohajer et al.

(10) Patent No.: US 7,788,279 B2
(45) Date of Patent: Aug. 31, 2010

(54) SYSTEM AND METHOD FOR STORING AND RETRIEVING NON-TEXT-BASED INFORMATION

(75) Inventors: Keyvan Mohajer, Saratoga, CA (US);
Majid Emami, Saratoga, CA (US);
Michal Grabowski, Solon, OH (US);
James M. Hom, Long Beach, CA (US)

(73) Assignee: SoundHound, Inc., San Jose, CA (US)

( * ) Notice: Subject to any disclaimer, the term of this patent is extended or adjusted under 35 U.S.C. 154(b) by 387 days.

(21) Appl. No.: 11/558,366

(22) Filed: Nov. 9, 2006

(65) Prior Publication Data

US 2007/0156645 A1 Jul. 5, 2007

Related U.S. Application Data

(60) Provisional application No. 60/735,748, filed on Nov. 10, 2005, provisional application No. 60/776,078, filed on Feb. 22, 2006, provisional application No. 60/771,705, filed on Feb. 8, 2006, provisional application No. 60/822,023, filed on Aug. 10, 2006.

(51) Int. Cl.
*G06F 17/30* (2006.01)

(52) U.S. Cl. .................. 707/772; 707/999.001; 707/999.003; 707/999.005; 707/999.102; 707/999.107

(58) Field of Classification Search ............... 707/1, 707/2, 7, 100, 102, 104.1, 200
See application file for complete search history.

(56) References Cited

U.S. PATENT DOCUMENTS

| 5,864,868 | A | 1/1999 | Contois |
| 7,487,180 | B2 * | 2/2009 | Holm et al. ............... 707/104.1 |
| 7,488,886 | B2 * | 2/2009 | Kemp .......................... 84/609 |
| 2002/0059272 | A1 | 5/2002 | Porter |

(Continued)

OTHER PUBLICATIONS

Bello, Juan Pablo, "Techniques For Automatic Music Transcription," Department of Electronic Engineering, King's College London, Strand, London WC2R 2LS, UK; downloaded Aug. 23, 2007, <http://ismir2000.ismir.net/papers/bello_paper.pdf>.

(Continued)

*Primary Examiner*—Tim T. Vo
*Assistant Examiner*—Dangelino N Gortayo
(74) *Attorney, Agent, or Firm*—Haynes Beffel & Wolfeld, LLP; Ernest J. Beffel, Jr.

(57) ABSTRACT

A method for non-text-based identification of a selected item of stored music. The first broad portion of the method focuses on building a music identification database. That process requires capturing a tag of the selected musical item, and processing the tag to develop reference key to the same. Then the tag is stored, together with the reference key and an association to the stored music. The database is built by collecting a multiplicity of tags. The second broad portion of the method is retrieving a desired item of stored music from the database. That process calls for capturing a query tag from a user, and processing the query tag to develop a query key to the same. The query tag is compared to reference keys stored in the database to identify the desired item of stored music.

16 Claims, 9 Drawing Sheets

U.S. PATENT DOCUMENTS

2003/0236663 A1    12/2003    Dimitrova et al.
2005/0005760 A1    1/2005    Hull et al.
2007/0076936 A1*    4/2007    Li et al. ..................... 382/129

OTHER PUBLICATIONS

Barigozzi, Matteo et al.; "Multiple String Alignment," <http://www.barigozzi.eu/msa.pdf>; downloaded on Nov. 6, 2006.

Typke, Rainer et al.; A Survey of Music Information Retrieval Systems, Proceedings of the Sixth International Conference on Music Information Retrieval (ISMIR), London, Sep. 2005.

Typke, Rainer et al.; "A Measure for Evaluating Retrieval Techniques Based on Partially Ordered Ground Truth Lists." International Conference on Multimedia & Expo (ICME) 2006, Toronto, Canada.

Hu, Roger et al.; "Polyphonic Audio Matching and Alignment for Music Retreival," 2003 IEEE Workshop on Applicationsof Signal Processing to Audio and Acoustics, Oct. 19-22, 2003, New Paltz, NY, pp. 185-188.

Eddy, Sean R., "What is Dynamic Programming?" Nature Biotechnology, vol. 22, No. 7, Jul. 2004, pp. 909-910.

Staab, Steffan et al. 'GETESS—Searching the Web Exploiting German Texts'. In Lecture Notes In Computer Science; vol. 1652 archive, Proceedings of the Third International Workshop on Cooperative Information Agents III, pp. 113 ? 124. Year of Publication: 1999 [retrieved on Aug. 14, 2007]. Retrieved from the Internet: <URL: htp://www.col.uni-saarland.de/publikationen/softcopies/Staab:1999:GSWa.pdf>.

International Search Report mailed Feb. 13, 2008 corresponding to PCT/US06/60748, International Filing Date: Nov. 9, 2006.

Shih, Hsuan-Huei et. al., "Multidimensional Humming Transcription Using A Statistical Approach For Query By Humming Systems", Proceedings of the 2003 IEEE International Conference on Acoustics, Speech, & Signal Processing, Apr. 6-10, 2003. Hong Kong (cancelled), pp. 385-388.

Jang, Jyh-Shing Roger et al., "A Query-by-Singing System based on Dynamic Programming1", International Workshop on Intelligent Systems Resolutions (the 8th Bellman Continuum), pp. 85-89, Hsinchu, Taiwan, Dec. 2000.

Raju, M. Anand, et al., "Tansen: A Query-By-Humming Based Music Retrieval System", National Conference on Communications, NCC 2003, Jan. 31-Feb. 2, IIT Madras 2003.

Kosugi, Naoko et. al., "A Practical Query-By-Humming System for a Large Music Database", pp. 333-342, Proceedings of the eighth ACM international conference on Multimedia, p. 333-342, Oct. 2000, Marina del Rey, California, United States.

Kosugi, Naoko et. al., "Music Retrieval by Humming—Using Similarity Retrieval over High Dimensional Feature Vector Space—", Proceedings of the 1999 IEEE Pacific Rim Conference on Communications, Computers and Signal Processing (PACRIM 1999) (pp. 404-407). Piscataway, NJ: IEEE.

Pauws, Steffen, "CubyHum: A Fully Operational Query by Humming System", ISMIR 2002, 3rd International Conference on Music Information Retrieval, Paris, France, Oct. 13-17, 2002, Proceedings 2002.

Lu, Lie et. al., "A New Approach To Query By Humming In Music Retrieval", Proc. of IEEE International Conference on Multimedia and Expo (ICME01), 2001, pp. 776-779. 2001.

Ghias, Asif, et.al., "Query By Humming—Musical Information Retrieval in an Audio Database", ACM Multimedia 95—Electronic Proceedings Nov. 5-9, 1995 San Francisco, California.

European Search Report mailed Oct. 13, 2009, PCT Application No. EP 06839808 (PCT/US2006/060748).

Bryan Pardo and Jonah Shifrin, "Name That Tune: A Pilot Study in Finding a Melody From a Sung Query", Journal of the American Society for Information Science and Technology, 55(4):283-300. 2004.

Bryan Pardo and William P. Birmingham, "Query by Humming: How good can it get?", SIGJR 2003, Aug. 1, 2003. pp. 107-112.

Josh Reiss et al., "Efficient Multidimensional Searching Routines for Music Information Retrieval", Proceedings of the 2nd Annual International Symposium on Music Information Retrieval 2001.

First Examination Report from the EPO dated Jan. 15, 2010, Regional Phase of PCT/US2006/060748 (EP Application No. 06839808.0), pp. 1-8.

* cited by examiner

SYSTEM AND METHOD FOR STORING AND RETRIEVING NON-TEXT-BASED INFORMATION

RELATED APPLICATION

This application is related to and claims the benefit of the following U.S. provisional patent applications:

U.S. Provisional Patent Application No. 60/735,748 filed on Nov. 10, 2005, naming Keyvan Mohajer as inventor entitled "Systems and Methods for Creating a Searchable Reference Database".

U.S. Provisional Patent Application No. 60/776,078 filed on Feb. 22, 2006, naming Keyvan Mohajer as inventor, entitled "Systems and Methods for Creating a Searchable Reference Database";

U.S. Provisional Patent Application No. 60/771,705 filed on Feb. 8, 2006, naming Keyvan Mohajer et al. as inventor, entitled "Dynamic Transition Matching"; and U.S. Provisional Patent Application No. 60/822,023 filed on Aug. 10, 2006, naming Keyvan Mohajer et al. as inventors, entitled "Systems and Methods for Creating a Searchable Reference Database".

All related applications are incorporated by reference herein for all purposes.

BACKGROUND OF THE INVENTION

The present invention relates generally to systems and methods for creating a searchable reference database, especially for, but not limited to, music and multimedia files. In particular, it relates to retrieving stored music using a non-text-based retrieval system.

Collections of stored music, maintained in databases, have become a common feature of the commercial landscape. Finding music in such a database can pose problems, however. A distinct problem is the difficulty imposed by the search methods offered by music databases. Generally, a user must start with a text entry, either generally stated or input to a specific search field, such as "Song Name" or "Artist." A user may not remember the exact name of the piece, however, or even the name of the artist, group, or composer. Here, not only can great confusion exist among the various incarnations of, say, Engelbert Humperdinck, but even if one can remember the name, spelling can be an issue. The universal requirement for text-based music searching makes such problems inherent in the art.

Moreover, once a start is made from text, the art has not succeeded in offering users a chance to hear the primary theme of a piece of music. Theme as used here refers to the combination of melody, rhythm and possibly lyrics, that a human listener would consider to be the main part of a piece of music. The art would find such a task difficult even if one had access to the original score and the lyrics of a piece of music. It is difficult, if not impossible, to automatically extract a theme from the score and attach it to the words from the lyrics. There have been some attempts to extract the main melody of a song from its digital format using signal processing and artificial intelligence approaches. These approaches have failed, especially in music involving multiple instruments playing simultaneously.

An opportunity thus arises to provide improved methods and systems for retrieving stored music, based on non-text-based retrieval methods.

SUMMARY OF THE INVENTION

An aspect of the invention is a method for non-text-based identification of a selected item of stored music. The first broad portion of the method focuses on building a music identification database. That process requires capturing a tag of the selected musical item, and processing the tag to develop reference key to the same. Then the tag is stored, together with the reference key and an association to the stored music. The database is built by collecting a multiplicity of tags. The second broad portion of the method is retrieving a desired item of stored music from the database. That process calls for capturing a query tag from a user, and processing the query tag to develop a query key to the same. The query key is compared to reference keys stored in the database to identify the desired item of stored music.

DETAILED DESCRIPTION

The following detailed description is made with reference to the figures. Preferred embodiments are described to illustrate the present invention, not to limit its scope, which is defined solely by the claims. Those of ordinary skill in the art will recognize a variety of equivalent variations on the description that follows.

It is to be understood that both the foregoing general description and the following detailed description are exemplary and explanatory only and are not restrictive of the invention, as claimed. In the following discussion, like numerals refer to like elements.

In general, the present invention can be envisioned in two broad, connected portions. First, one must prepare a database of stored music, built around a non-text-based structure. Then one can retrieve desired musical items, utilizing non-text-based search and retrieval mechanisms. The first half of that whole is generally depicted in FIG. 1 and the accompanying discussion, the second in FIG. 2.

Music Tagging

Figure 1:
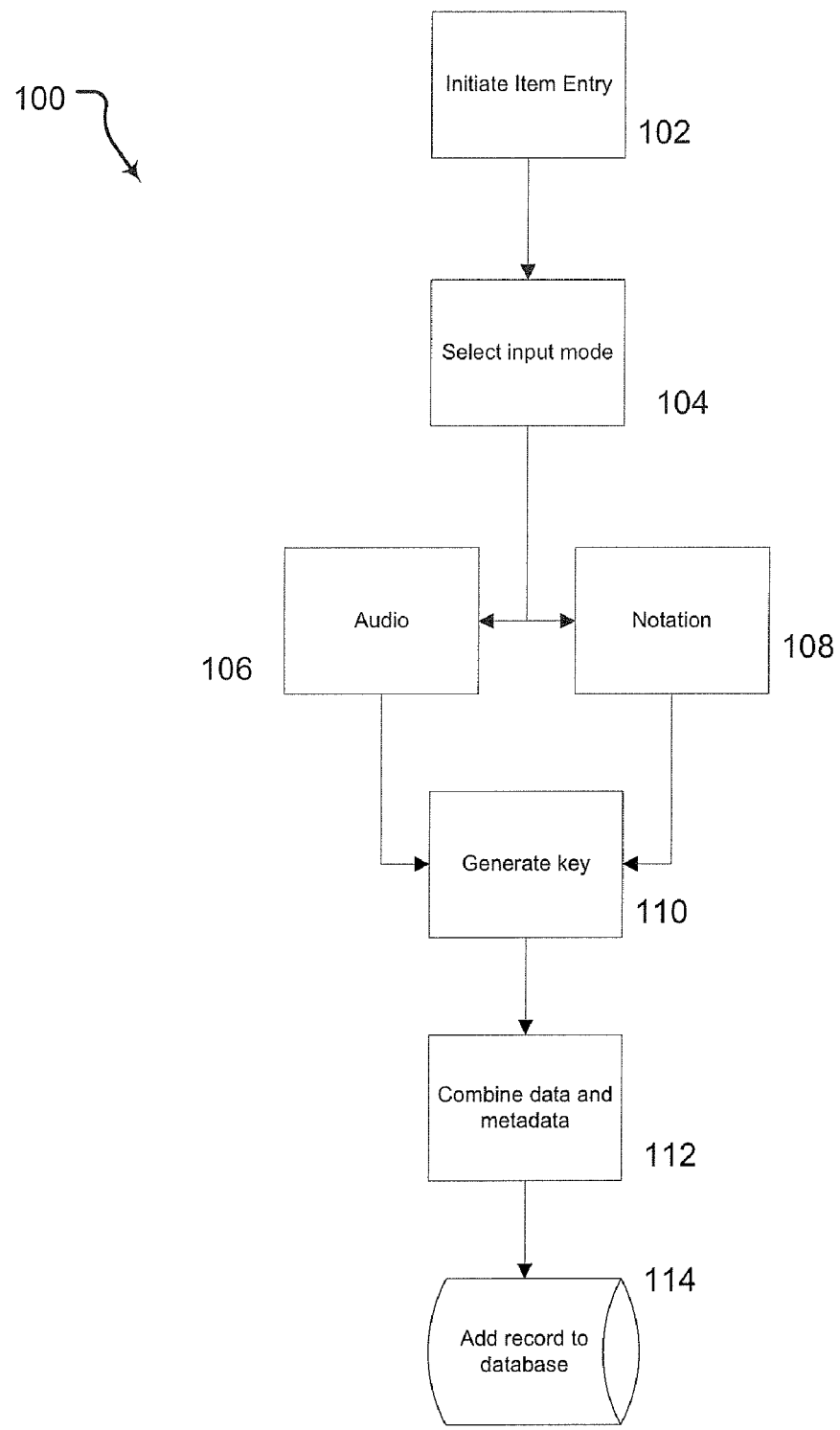
FIG. 1 illustrates an embodiment of a process for building a non-text-based database of stored music.

FIG. 1 depicts a process 100 for building a non-text-based music database. It will be understood by those in the art that such a database has a number of possible applications. In one embodiment, the database supports a music sales portion of a larger business, such as a web-based general sales operation that sells books, electronic devices and other products as well as music. Another embodiment employs the database in kiosks located in music stores, enabling shoppers to identify desired music. In both such instances the music search system feeds data to a shopping engine of some sort. Alternatively, the database can be the primary driver of a standalone website, and that example is depicted herein. Those in the art have the skill to adapt the example shown to other environments and applications. An important such application could adapt the method of the invention to a mobile phone environment, where the small keypad offers a strong incentive to the ability to indicate a music choice by singing rather than typing.

The key concept underlying this database is that it contains human renditions of human perceptions of the themes of music items. Thus, the database does not contain the original music items, nor even reference portions of those items. It contains what is referred to here as "tags", audio files, generally short renditions (tens of seconds rather than minutes in length), that record music themes, as rendered by humans, either directly or indirectly, as set out below. The term "tag" will be used hereafter to denote such a rendition.

It should be noted that the existence of a group of human-derived exemplars of the music completely evades that key problem limiting the prior art—that is, the requirement to extract some simple version of a music theme from complex audio files. Here, not only is the reference sample a simple, straightforward product, but it is also a human product, not a computer construct. The perception of the querying human is more likely to match the human perception of the tagger much more closely that the perception of a computer program. The result is a set of data that facilitates the entire search process.

After initiating the "add music" function by a conventional method, such as a radio button, menu choice or the like, the user must choose whether the tag will be entered in the sound input mode or the indirect, or notation, input mode. The former choice requires the user to produce a sound rendition of the user's perception of the music theme. The sound rendition can take any form the user likes—singing, humming, whistling, etc. The only requirement is that the input be an audio signal. That requirement imposes the need for an audio input device, such as a microphone, but the nature and quality of such device can be left to the user. Because the user is entering an item into the database, as opposed to entering a search request, the name of the piece of music must be provided. In addition, the user can provide an artist name, to indicate either that a particular rendition of a piece is being suggested, or simply to provide more information for future searchers. In one embodiment, the user-provided text information is subjected to an intelligent validation routine, which looks for spelling errors and the like, in an effort to ensure the cleanest possible data. That routine can be expanded to examine context, to be able to query the user, for example, whether the user is sure that Aerosmith recorded the Bach cantatas.

Figure 2:
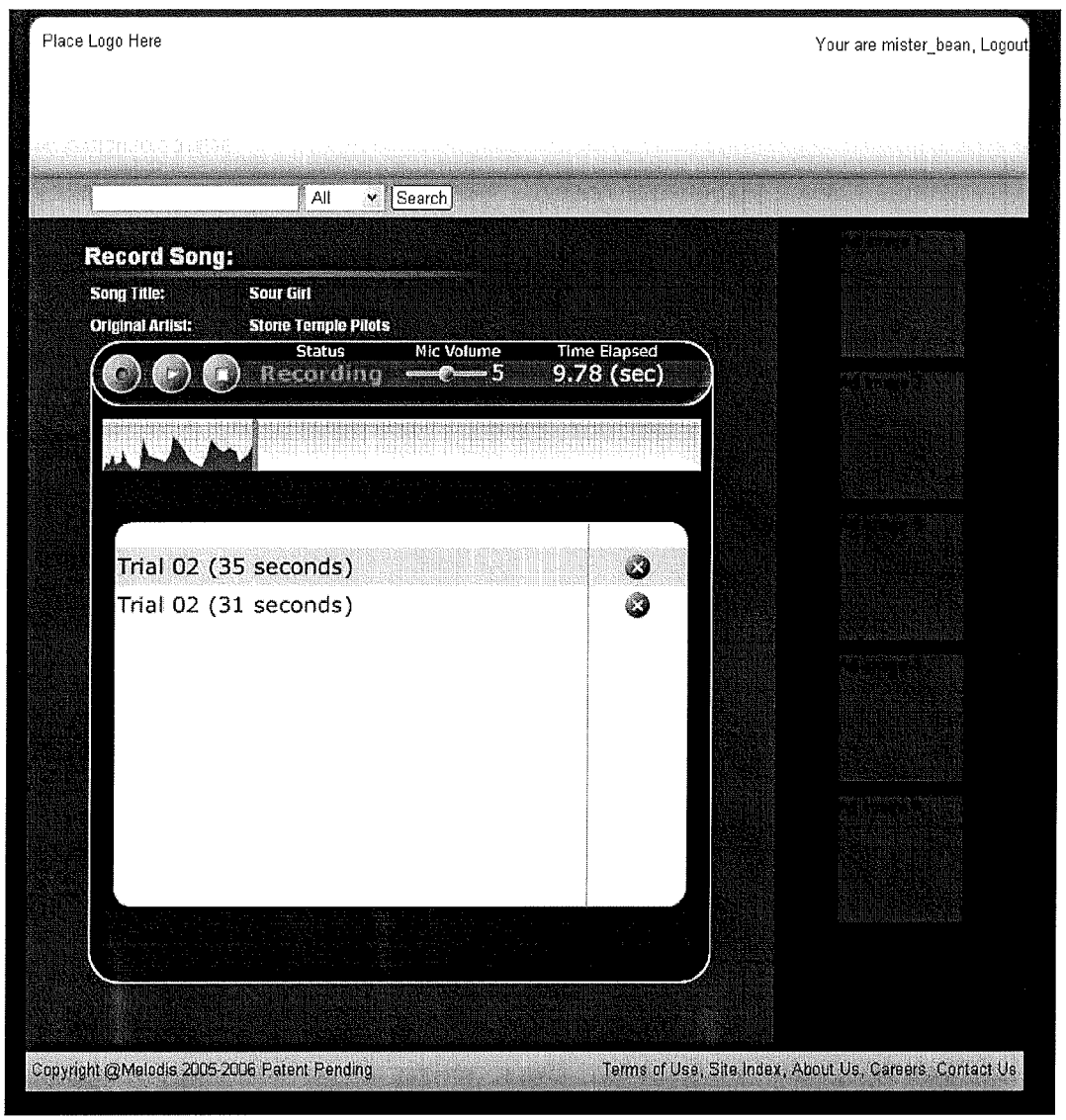
FIG. 2 shows one embodiment of a graphical interface for controlling the recording of a tag according to the embodiment illustrated in FIG. 1.

If the user chooses a sound input, the system can provide a graphical interface such as that shown in FIG. 2. There, a screen 140 echoes the text information provided by the user, as well as providing recording controls. The screen shows typical controls widely used in recording devices both on and off the internet, which controls can be altered or presented however best suits the needs of a particular embodiment.

The sound input can be captured and saved in any of the known formats for handling musical material, such as WAV, MP3, WMA and so forth. Different file formats will require adaptation of processing systems set forth below, but such adaptations are well within the level of ordinary skill in the art.

Figure 3:
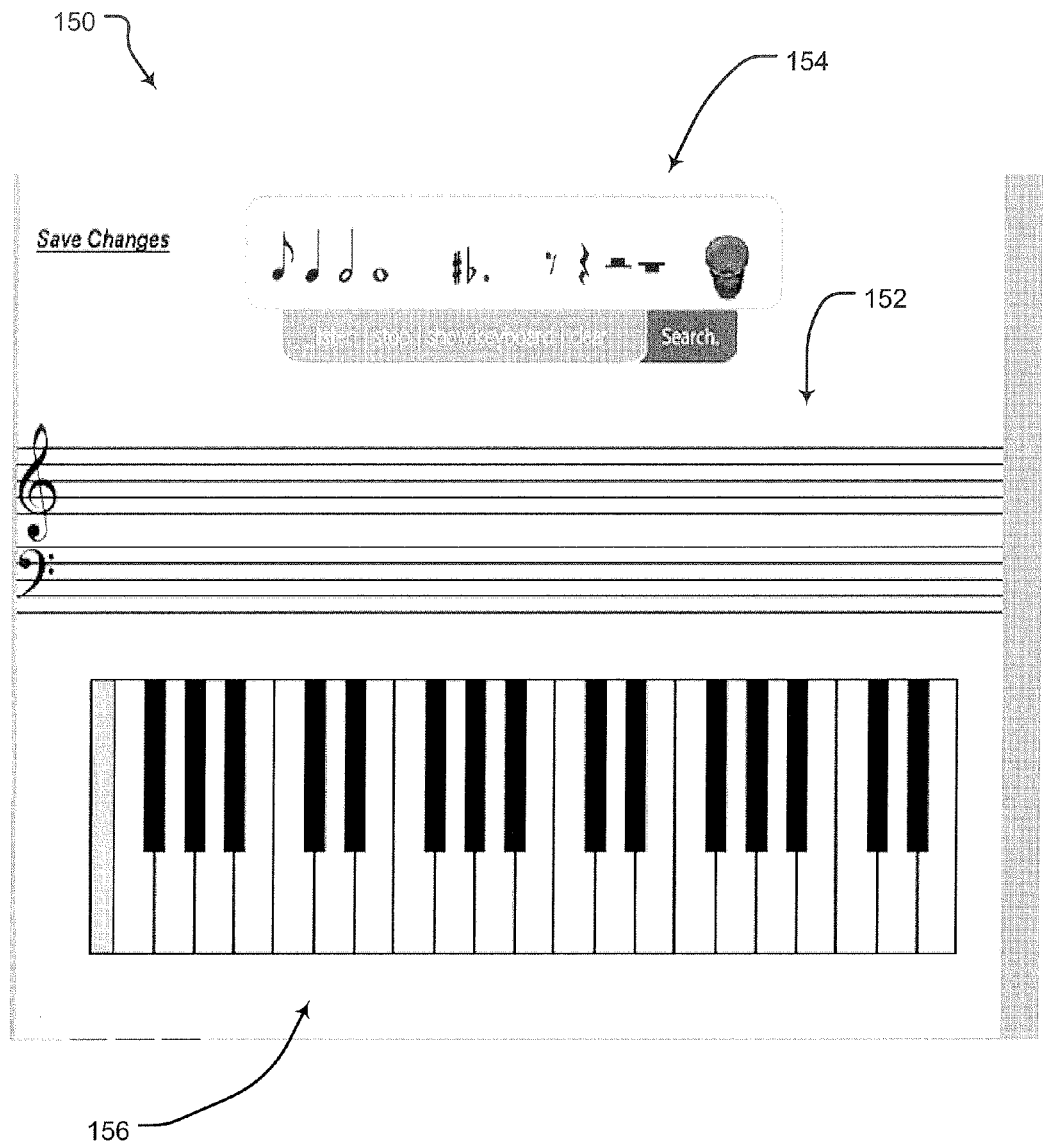
FIG. 3 shows one embodiment of an indirect tag entry interface.

Alternatively, the user can opt for a non-audio input, using an interface such musical input interface 150 shown in FIG. 3. This interface allows the user to enter a theme employing direct musical notation. A staff 152 is provided, here set up in piano style, with treble and bass clefs, and a drag and drop area 154 provides notes in various time values, sharp and flat symbols, and rests of various values. The user can drag and drop symbols onto the staff to create the theme. In addition, a keyboard 156 is also provided, which allows a user to click on keys, causing notes to be displayed on the staff. A number of techniques for entering musical notation are known to the art, and those in the art will be able to choose and adapt such techniques to the needs of specific applications involving the invention claimed herein.

A highly useful input method would be a MIDI interface, so that a user could input a theme by playing it on a keyboard or other instrumental MIDI device. Those in the art will understand the most effective methods for converting a MIDI-generated file into a format preferred by the present system.

A notated input is converted into a musical format, as noted above, preferably the format chosen to handle audio material, as noted above.

The system at this point has a file that can be played back and heard by humans, but is relatively useless a tool for matching music items. Even beyond the issues of matching file content. The art is clear that signal processing is required to arrive at the point where a matching algorithm can be applied. The art has proposed a number of solutions, but until the present invention, no method has provided a suitable result.

Figure 4:
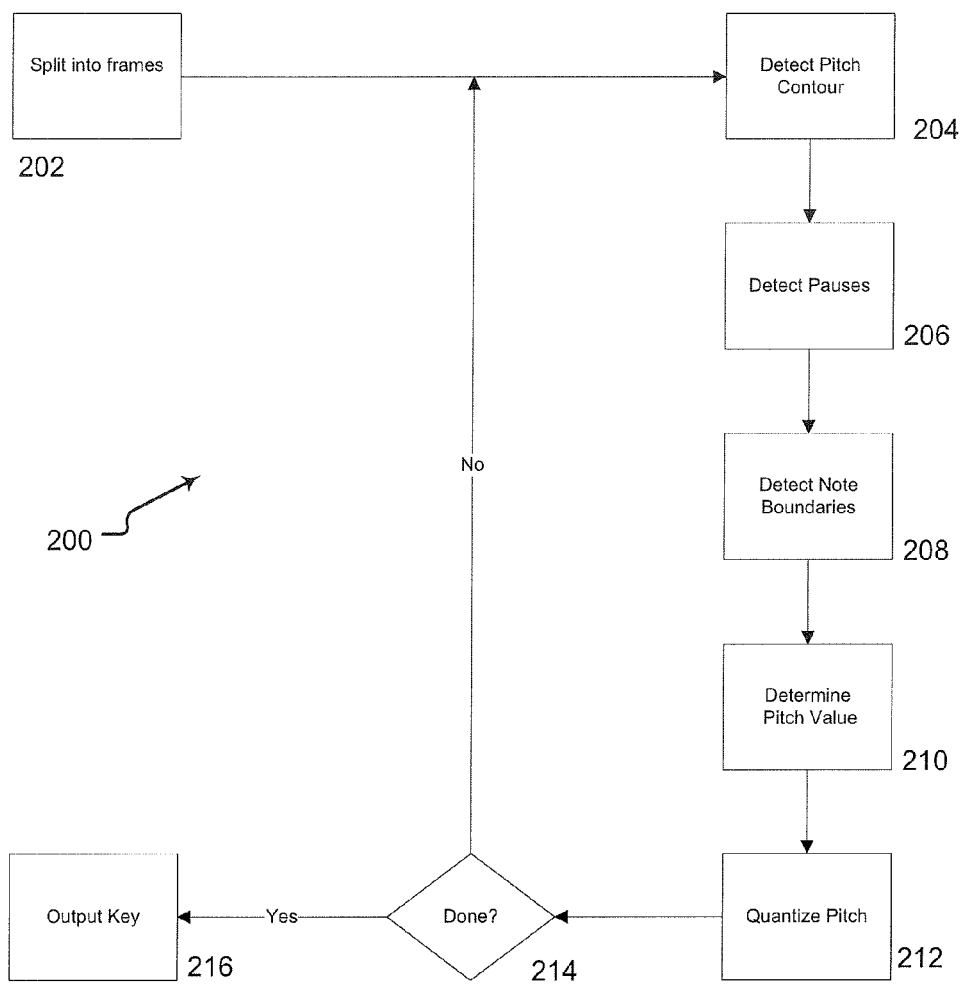
FIG. 4 depicts the building of a tag key according to the embodiment of FIG. 1.

FIG. 4 sets out an embodiment 200 of a process for producing inputs to the matching algorithm. This process consists of processing the tag content to produce a data structure suitable for further operations by the matching algorithm, such data structures being referred to as "key" files hereafter.

It will be further understood that a music retrieval system could employ pre-recorded music files to be matched by a user's input. Such files could consist of existing music recording, or extracts from the same, or from specially-recorded versions of such music. For any of these or other methods of providing reference music, the processing of the audio file into a key file proceeds as set out below.

Initially, the audio file is divided into frames, of a suitable working length, such as 25 ms. As will be understood from the description of the method itself, the fact that this embodiment sets boundaries between signal levels, the audio file is not split into abutting frames, but rather an overlap between adjacent frames is provided. It is preferred that such overlap amount to about 50% of the frame length.

Steps 204-212 set out the process applied to each frame in turn, aimed at starting with the digitized audio signal and deriving a sequence of musical note values. The first action, at step 204, is to detect the pitch contour. A number of techniques are known to the art for accomplishing this result. Various embodiments utilize pitch trackers employing autocorrelation pitch tracking, or average mean difference function (AMDF) analysis, or harmonic grouping. Any of these or other known methods may be employed to produce an output consisting of a vector of pitch values, with one pitch value per frame. The output thus corresponds to a track of the pitch value over time.

Next, the pauses (periods of silence) are identified, in step 206. That can be accomplished by a number of known methods. One embodiment employs an energy histogram, based on either the raw or log value of the sound energy. Then, if multiple modes are determined to be present, the system dynamically calculates a "silence threshold", which defines the boundary between sound (values greater than the boundary) and silence (those values below the boundary).

Considering the periods where sound is present, step 208 determines the positions of boundaries between notes. One embodiment analyzes energy levels and pitch values, keying on points at which either factor changes by more than a selected threshold value. Another embodiment looks to the cross-correlation between consecutive frames. These and other techniques known to those in the art produce time values at which one note changes to another.

It will be appreciated that the pitch values between adjacent note change points will most likely vary. Note slurring and legato effects practically ensure that human renditions will not consist of a succession of pure notes. Converting the audio file to a series of notes requires that fixed pitch values be chosen for each note, however. Thus, step 210 assigns a single pitch value to each note period. One embodiment utilizes the arithmetic mean of the pitch contour between note boundaries. Another embodiment employs the geometric mean. Other techniques can be employed, as known in the art.

Finally, the note pitch values are quantized—that is, set to correspond to a musical note having a predefined value. The particular note is chosen in step 212 to minimize the difference error in quantization. It should be noted that the present method is able to deal with, and produce results in, any given system of musical intervals. For Western music, the semitone system is most generally employed, but the system is equally able to work with various other tuning systems, simply by selecting different quantization tables. Similarly, both equal temperament and well temperament can be provided for.

The result, for each frame, is a sequence of multidimensional vectors, with values representing at least pitch and duration. Other embodiments can employ additional dimension, taking into account volume, attack, and other musical characteristics, as well as phonetic factors.

Step 214 determines whether all frames have been processed, and loops back through steps 204-212 until that is accomplished. When processing has been completed, the key is assembled from the frame results, taking into account the amount of overlap between frames.

Figure 5:
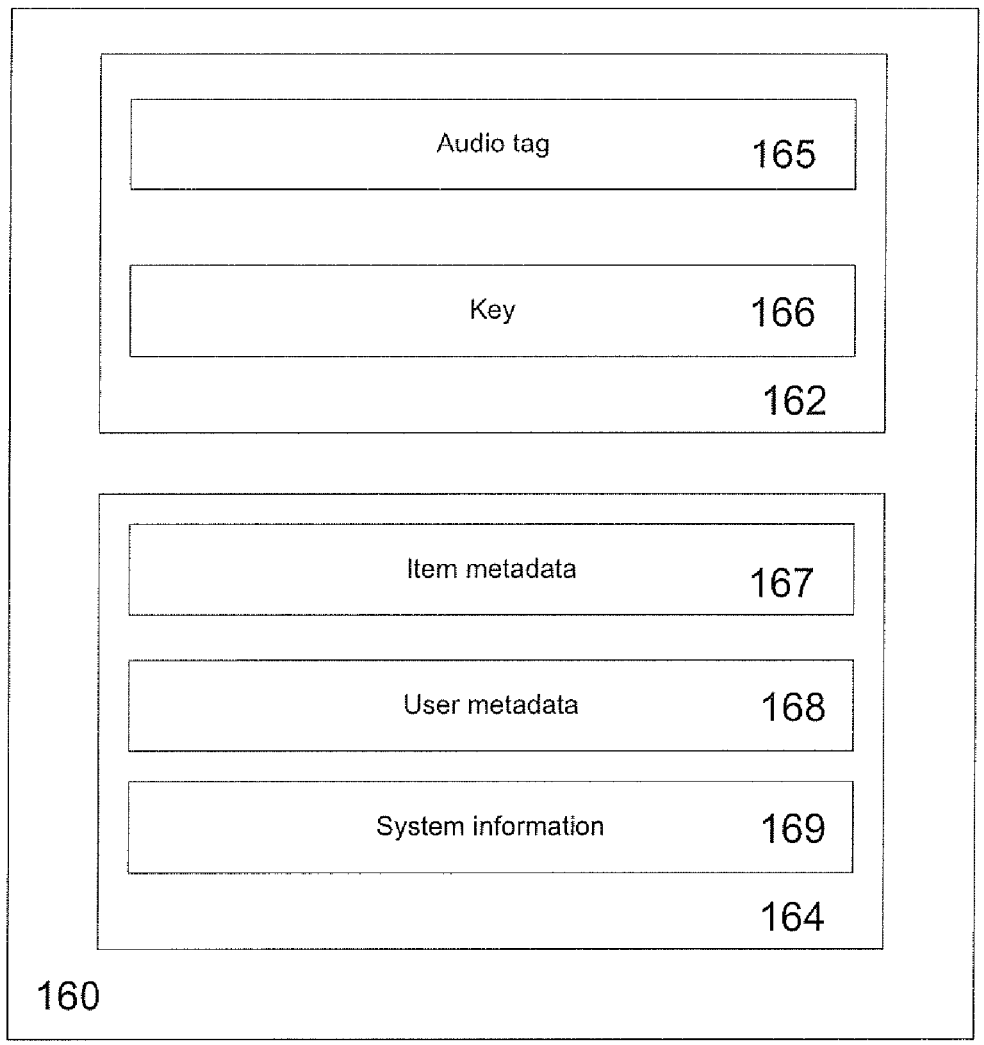
FIG. 5 shows a structure for the data record of the database for retrieving stored music.

To this point, the system has collected data and metadata. Data items include the audio tag and key. Metadata is of several types—item metadata, such as the name of the piece, artist, etc.; user metadata, such as the user's name and, in some embodiments, other identifying data; and system metadata, such as the entry time or other information useful to the operation of the application. The system can at this point build a data record, as shown in FIG. 5. There, a data record 160 consists of data items 162 and metadata 164. The former category includes the audio tag 165 and the key 166, and the latter includes item metadata 167, user metadata 168 and system metadata 169.

Further details of the database system itself can be left to those in the art. Typical database applications sufficient to support the embodiment shown, and similar structures, are provided by Oracle Corp., Microsoft Corp. and others. Given the data structures shown here, those in the art will be able to build and support required database applications.

A point that should be noted is that the present system does not require the use of data indexes in order to provide rapid search results. The system will be able to provide direct retrieval operations employing the key files, without any indexing system, even at a massive scale. It may be desirable at some point to introduce an indexing method, but that step is not required for the operation of the system as disclosed and claimed here.

The application embodiment under discussion must amass a sizable database of tags, in order to ensure broad coverage. Additionally, it will be advantageous to collect a number of tags for each possible piece of music, in order to further ensure that good quality tags are present. The first question, that of quantity, can be addressed by building a number of incentive plans, aimed at motivating users to enter tags. One method could be a straightforward payment plan, where a user is compensated a stated amount for every tag entered. While that method is simple, it fails to motivate quality entries. In an application environment where the system not only operates the music database but also sells music performances, a preferred method would be a commission model, in which a user is compensated each time another user buys a music item based on a tag entered by the first user, as explained in more detail below. Users entering a number of tags, particularly a number of high quality tags, may achieve recognition by being identified as "power taggers" or the like, in an appropriate page of the website. A number of incentive plans are possible, and users will likely employ a range of them in different situations.

In addition to traditional sorts of compensation schemes, a system operator might leverage the tags into a revenue source, as by offering tags for download to mobile phones as ringtones. Such offers could be based on monetary payments, or the ringtones could be incorporated into incentive plans. In addition, theme contribution could further be encouraged by providing the original tagger a payment or other credit, for each time his or her tag was downloaded. Other revenue opportunities will occur to those in the art, all within the scope of the claims herein.

The question of quality submissions is a separate, but no less important issue. There are a number of persons who do not perform music very well, and if such persons enter tags, that tag may bear little resemblance to the actual music item. Thus, a subsequent user trying to "hum a few bars" may well submit a superior rendition of the piece, but based on the sample, the correct result will not be returned.

Figure 6:
FIG. 6 shows one embodiment of a graphical interface for controlling the voting for the quality of a tag according to the embodiment illustrated in FIG. 1.

One possible solution to that problem, adopted in the embodiment under discussion, is shown in FIG. 6. There, users are afforded the opportunity to listen to existing tags and to vote on the quality of the performance. The web page displayed there allows the voting user the opportunity to view pertinent metadata (the tagger's name, item information, etc.) and to vote, using a 10-star system, for the quality of the tag. Votes allow the system to differentiate among tags, identifying those that best replicate the theme and those that do not. As with tag entries themselves, the system operator will likely want to incent users to submit votes, at least early in the history of any given system. The use of the voting information in retrieving data will be covered below. The voting information can be incorporated into the basic database system in a number of ways, shown in various embodiments. One method, followed in the embodiment shown, is simply to link a voting results table to the basic tag table, with further links to those users providing the votes. Those in the art will devise other means, equally effective, for performing this task.

It should be noted that early system operators can develop tag databases that can then be sold to others as a standalone product. Thus, for example, a web-based enterprise could develop a sizeable user community, producing a large, useful tag database. A music store is unlikely to be able to develop such a database, and thus a market could exist for the database per se. This further illustrates the fact that the building and retrieving portions of the system can operate independently. It can be easily envisioned that one enterprise could conduct a business solely consisting of developing and marketing such databases. Other companies could similarly function in a manner that never performs any of the building steps but rather only employs an existing database to perform searches.

Sequence Matching and Scoring

Figure 7:
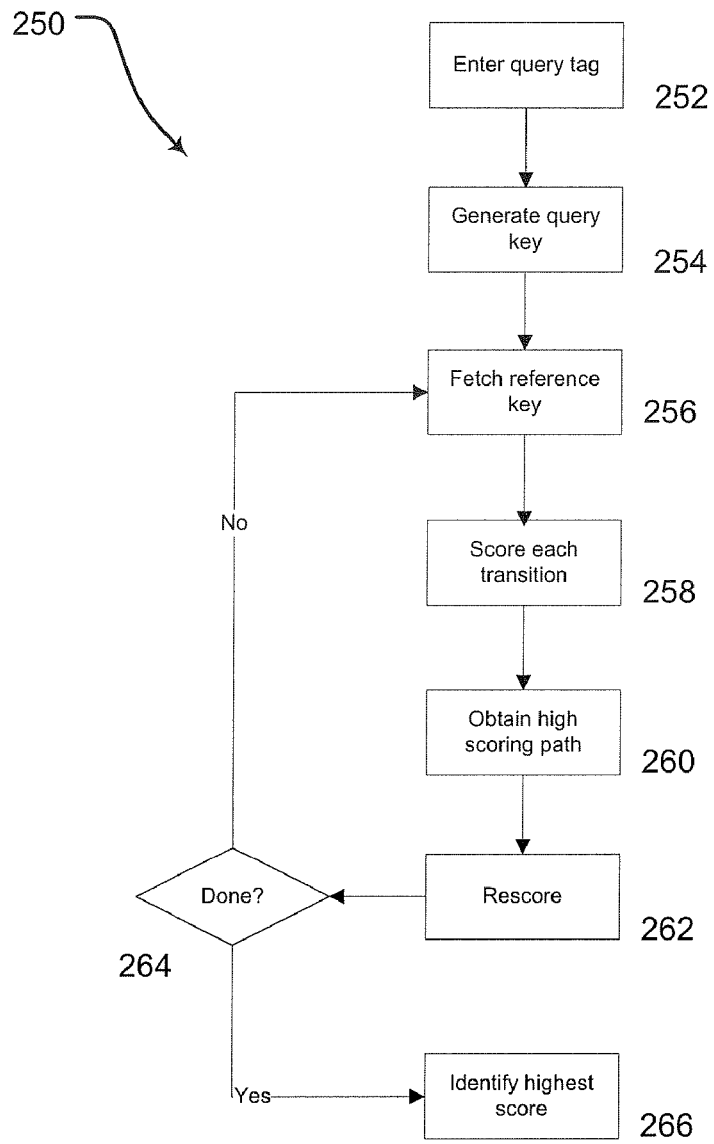
FIG. 7 illustrates an embodiment of a process for retrieving stored music.

Having constructed a tag database, the system is prepared to retrieve stored music, as shown in FIG. 7. The first user step, 252, in retrieving music is to enter a "query tag"—that is, to perform exactly the steps set out above to produce a database tag. Hereafter, tags in the database, and their associated keys will be referred to as "reference" tags and keys. In one embodiment of the system, the user is able to enter the "query tag" either directly or indirectly (using notation), as was done in connection with tag creation. In any event, the result of this step is the creation of a query having the same structure as a tag.

Next, the query tag is used to generate a query key, in step 254, employing exactly the same procedure set out above. For convenience, the discussion below employs the terms "query" and "reference" to refer to the query key and reference key, respectively.

In general, the succeeding steps 256-266 find the best match to the query by interactively fetching each query, analyzing it as set out below, and then comparing the analyses. These analyses are aimed at expressing, in a numerical score, the degree to which a reference sequence—or rather, a portion of a reference sequence—matches the query sequence, and then ranking the quality of that match according to the scores.

The fetching operation, step 256, proceeds conventionally. Although no indexing system is applied, if rankings by users have been obtained, as discussed above, those ranking can be employed to group references so that the higher-ranked references will be fetched before lower-ranked references. One embodiment proceeds by fetching all exemplars of a given musical piece (identified by metadata), in rank order, before proceeding to another piece. Another embodiment fetches references in rank order, so that queries are run first against all high-quality references, and only later against lower-ranked ones. Such arrangements are left to the judgment of system operators.

The best match between a query and a reference is determined by comparing the search query and the references in the database. This can be done in a number of ways, generally subsumed under the heading "string alignment." A number of such methods, such as the "distance" method, the Needleman-Wunsch algorithm, or the so-called Traveling Salesman Problem, and others, are known in the art. One embodiment, discussed in detail and claimed herein, employs an alignment process referred to as Dynamic Transition Matching (DTM), a technique derived from dynamic programming. FIG. 7 shows this method in flowchart form, as process 250. DTM is a generic process for matching sequences of events by analyzing, quantizing and then matching transitions between events rather than the events themselves. These sequences ("nodes") are potentially multidimensional, and they may be completely different because every dimension of their nodes could be in different coordinate systems. Transitions between dimensions of the nodes, however, may be matched regardless of their coordinate system if the technique is defined properly for each dimension (e.g., difference, ratio, etc.). DTM therefore represents a generic and powerful technique, applicable to various applications, with multiple dimensions and multiple definitions of transitions for different dimensions. For simplicity of this presentation, the present discussion limits the examples to the melody matching application of the illustrated embodiment. Here, the terms "node" and "note" are used interchangeably. Those in the art will appreciate the broad applicability of the technique to other fields and disciplines.

At this point in the process, the embodiment has the query and the reference, in the form of two-dimensional sequences. Each note in the sequence is a vector of pitch value and duration value. Other embodiments may include phonetic content and other information, as desired.

The reference sequence can be denoted as: $(r1, d1)$, $(r2, d2)$, ..., $(rn, dn)$, where the r values represent the pitch index and the d values represent the duration index. Similarly, the query sequence can be denoted as: $(q1, t1)$, $(q2, t2)$, ..., $(qm, tm)$.

Generally the size of query, m, is smaller than the size of reference, n, but that is not a requirement. DTM does not require normalizing the time scale, or that the pitch scale of the key and the query be the same. There is also no need to convert the sequences, for the purpose, for example, of removing pauses or conversion of raw sequence to a sequence of transition values—analysis can proceed using raw data. The technique matches transitions between two nodes in the key compared to the transitions between two nodes in the query, hence the name Dynamic Transition Matching. Comparison between these two transitions can take one or more features into account—for example, embodiments can employ semitone difference, duration ratio, phonetic content and other properties, as desired.

The DTM technique works with two sequences, such as,

Query=(60,12),(pause,6),(65,12),(71,2),(72,10),(67, 23),(65,12)

Reference=(89,10),(90,10),(pause,5),(95,10),(102,10), (97,20),(95,10),(90,10)

As discussed above, the values for each sequence member represent pitch and duration values, as determined by the key extraction process. It is clear that the query, which contains seven members, can be aligned with the reference starting at the first members of each sequence, leaving the last member of the reference without a matching note, or by matching the last notes and leaving the first reference note unmatched. Moreover, a system dealing with actual music must also allow for the possibility that two or more notes in a sequence should be consolidated, to allow for phenomena such as slurs and grace notes. In the query sequence here, for example, member four has practically the same pitch as member five, and also has a very short duration.

A solution to the matching problem is shown in Table 1. Note how pauses are matched, and note also the consolidation of (71, 2) and (72, 10) in the query to match the note (102, 10) in the reference. As a result, the first and last reference sequence members are unmatched by corresponding query members.

TABLE 1

Alignment example.

| | |
|---|---|
| — | (89, 10) |
| (60, 12) | (90, 10) |
| (pause, 6) | (pause, 5) |
| (65, 12) | (95, 10) |
| (71, 2) | (102, 10) |
| (72, 10) | |
| (67, 23) | (97, 20) |
| (65, 12) | (95, 10) |
| — | (90, 10) |

Optimum alignment analysis is built around a matrix, or score table, such as Table 2, below, in which cells on the i axis represent vectors in the reference sequence and cells on the j axis the vectors of the query. Table 2 represents an illustrative portion of the complete table that would be constructed to analyze the example query and reference. Values for $(r_i, d_i)$ and $(q_j, t_j)$ are shown.

TABLE 2

Score Table

|  | (r1, d1) (60, 12) | (r2, d2) (p, 6) | (r3, d3) (65, 12) | (r4, d4) (71, 2) | (r5, d5) (72, 10) |
|---|---|---|---|---|---|
| (q1, t1) (89, 10) | i = 1, j = 1 |  |  |  |  |
| (q2, t2) (90, 10) |  |  |  |  |  |
| (q3, t3) (p 5) |  |  |  |  |  |
| (q4, t4) (95, 10) |  |  |  |  |  |
| (q5, t5) (102, 10) |  |  |  |  | i = 5, j = 5 |

This analysis shares some features with the Needleman-Wunsch algorithm. Primarily, the analysis proceeds by traversing the matrix from upper left (i=1, j=1) to lower right (i=max, j=max), proceeding down each column in turn, and for each cell, calculating a score S(i, j).

The end product of the analysis is the optimum path from (i=1, j=1) to (i=max, j=max), in terms of the optimum traversal from cell to cell. Given the constraints on movement implicit in the Needleman-Wunsch method, traversal from a cell (i, j) can only proceed three ways: in a downward diagonal to (i+1, j+1); vertically to (i, j+1); or horizontally to (i+1, j). In terms of actually matching sequences of values, it can be seen that the diagonal movement corresponds to matching a new pair of values. Thus, at (i=1, j=1), (r1, d1) matches (q1, t1), and the movement to (i=2, j=2) produces a new match, (r2, d2) to (q2, t2). Vertical or horizontal movement moves on one axis but not the other. Thus, at (i=1, j=1), (r1, d1) matches (q1, t1), but the vertical movement to (i=1, j=2) tries to match, (r1, d1) to (q2, t2). Clearly, the only way that operation could work is to delete the one of (q1, t1) or (q2, t2), and thus these operations are referred to as vertical and horizontal deletions, respectively.

An important concept is that each cell has a parent cell (i, j), on which the cell's score is based. The parent cell is determined during the scoring process, based on the traversal that produces the highest score. For a match, the parent cell is (i−1, j−1). For a vertical deletion, the parent is (i−1, j), and for a horizontal deletion, the parent is (i, j−1).

Thus, scoring, step 268, consists of testing the three possible traversals that could have arrived at the test cell, starting with the score of the parent cell, and applying an appropriate scoring function to determine which of the possible traversals produces the best score. Scoring for each cell thus depends heavily on what has gone before. Moreover, the scoring system is structured to reward matches and discourage deletions, by assessing a deletion cost for those traversals. In general, the scoring formula is as follows:

$$S(i,j) = \max(S_{DV}, S_{DH}, Sm, 0) \quad (Eq\ 1)$$

where
$S_{DV}$=VERTICAL_DELETION_SCORE
$S_{DH}$=HORIZONTAL_DELETION_SCORE
$S_m$=SUBSTITUTION_SCORE (Match)
Note that the score of a cell cannot go below 0.

Boundary conditions are applied by ensuring that traversals are actually possible. At (i=1, j=1), for example, the upper right corner, no movement of any kind is possible, so the only recourse is to score the cell at the default value of 0. In other cells in that column, vertical deletions are possible, but no matches or horizontal deletions can be made.

Applying those principles, scoring for the three possible traversals, the scores are calculated as follows:

$$S_{DV} = S(i-1,j) - DV$$

$$S_{DH} = S(i,j-1) - DH$$

$$S_m = S(i-1,j-1) + T$$

where DV and DH are deletion cost factors, and T is the transition function.

The transition function is the value of the movement from (i−1, j−1) to (i j). Those in the art can determine appropriate transition functions for specific applications in which the DTM technique is applied. For a music search application as set out herein, T is the weighted combination of the absolute value of the difference of each dimension, which in the examples set out are pitch and log of duration. Modifications of that principle are set out below.

As noted above, many situations will arise in a music application in which it would be advantageous to combine adjacent notes. That process can be integrated into the scoring process by adding a factor that measures results of such combination. Adding conditions that analyze vertical and horizontal consolidation, the resulting score function is as follows:

$$S(i,j) = \max(S_D, S_{DH}, Sm, S_{HC}, S_{VC}, 0) \quad (Eq.\ 2$$

where
$S_{DV}$=VERTICAL_DELETION_SCORE
$S_{DH}$=HORIZONTAL_DELETION_SCORE
$S_m$=SUBSTITUTION_SCORE (Match)
$S_{HC}$=max(HORIZONTAL_CONS_SCORE(h)), h=1, 2, 3, . . . , Hmax
$S_{VC}$=max(VERTICAL_CONS_SCORE(v)), v=1, 2, 3, . . . Vmax
Note that the score of a cell cannot go below 0.

The scoring process of the present method differs markedly from similar algorithms of the prior art. First, the art has not developed an effective method for addressing the problem of pauses—that is, periods of silence in a musical piece. This issue does not arise in analysis of phenomena such as genetic sequencing, as one cannot have a genetic sequence in which some of the bases have no value. Here, pauses are treated as an "undefined" value, allowing analysis to proceed, which also allowing special consideration to be given to pauses, as set out below.

In addition, it is important to understand that the analysis here focuses on the transitions between notes, and not on the notes themselves. In consequence, the scoring process consists of a determination whether the highest score is achieved by deleting the previous note, in either a vertical or horizontal direction; by combining two or more previous notes, again in either a vertical or horizontal direction, or by treating the transition as a "match"—that is, a simple movement from the previous note to the present one. All five possible transitions are analyzed, and the one presenting the highest score is retained, with that score entered at the appropriate spot in the matrix.

A number of modifications and additions are possible for each portion of the score function. The following discussion focuses on each component in detail.

$S_{DV}$=VERTICAL_DELETION_SCORE

This score results from a vertical deletion, or the deletion of a note in the query according to table 2. A deletion is not favored, as can be understood, and thus a cost is assessed. If the cost for a vertical deletion is DV, then:

$$S_{DV}(i,j)=S(i,j-1)-DV \qquad (Eq. 3)$$

The deletion cost can be further normalized by the importance of the note that is being deleted. If the duration of the note that is being deleted is tj, then the normalized deletion cost could be DV*tj/mean_q where mean_q is the mean of the duration of the query sequence over all non-pause nodes.

$$S_{DV}(i,j)=S(i,j-1)-DV*tj/\text{mean}\_q \qquad (Eq. 4)$$

As noted above, a deletion signifies the actual deletion of a transition. However, a transition is deleted by deleting one of the two nodes that comprise that transition (referred to as source and destination nodes). A decision must be made whether the past/source (j−1) or present/destination (j) node should be deleted. This decision generally depends on the application. However, a note cannot be deleted if it has already been matched in another transition. The following rule is therefore used:

If score(i,j)>0: this means there have been previous matches with positive score and therefore the node at j−1 has been a positive match. In this case, delete the new node at (j).

If score==0: in this case, no positive matches have survived on the current path. The node (j−1) is therefore not useful and can be deleted.

It is important, for the purpose of a substitution score, to keep track of the deleted nodes. Once a node is deleted, the properties of its parents are propagated forward so that they can be used in the calculation of the substitution.

$S_{DH}$=HORIZONTAL_DELETION_SCORE

This step is identical to the vertical deletion step described above, but it deals with the deletion in the reference in the horizontal direction of table 2. The parameters are changed accordingly: DH is used instead of DV and so on.

Sm=SUBSTITUTION_SCORE (Match)

This score results from taking the path from (i−1,j−1) to (i,j). This corresponds to the transition from (qj−1,tj−1) to (qj,tj) in the query compared to the transition from (ri−1,di−1) to (ri,di) in the reference. However, in case the parent nodes have been deleted, the values that are propagated into them are used in this calculation. For example, if (ri−1,di−1) has been deleted on this path in a previous step, the values of its parent's dimensions have been propagated into it. These values are used in this step instead of (ri−1,di−1).

The new score, Sm(i,j), is calculated by adding the score of the parent S(i−1,j−1) to the score of the transition from (i−1, j−1) to (i,j). Since the transition is between multidimensional nodes (in this case pitch and duration), the relative weight of the scores needs to be determined and used accordingly. These parameters can be adapted to different queries. The generic formula for calculating the substitution score using multiple dimensions is as follows:

$$Sm(i,j)=S(i-1,j-1)+w1*ST1+w2*ST2+\ldots \qquad (Eq. 5)$$

where ST1 is the score of transition in dimension 1 (e.g. pitch), ST2 is the score of transition in dimension 2 (e.g. duration) etc. And w1, w2, . . . are the relative weights for these transitions. In another embodiment of the DTM technique, instead of combining the scores for each dimension at every stage using the weights, it is possible that an array of scores is propagated and a decision is made after several stages based on a more complex criteria using the array of scores.

In melody matching, Eq. 4 reduces to:

$$Sm(i,j)=S(i-1,j-1)+R*\text{pitch\_reward}-K*\text{tempo\_error} \qquad (Eq. 6)$$

where, pitch_reward is the score for transition from (qj−1) to (qj) compared with the transition from (ri−1) to (ri). And, tempo_error is the transition error for going from (tj−1) to (tj) compared to the transition for going from (di−1) to (di).

Similar to the deletion error, the substitution score can also be weighed according to the duration of the notes being matched. This is done by multiplying the added score by the duration of the note in the query normalized by its mean (tj/mean_q), or ((tj−1+tj)/mean_q)

The pitch reward is a number between 0 and 1 and is calculated using qj, qj−1, ri, ri−1 as follows: pitch_reward=1-pitch_error and pitch_error is calculated as follows:

Case I: There is no "pause" in qj, qj−1, ri, ri−1:
The pitch error, is calculated as the absolute of the difference of the transitions, with mod 12 operation to allow octave jumps, and then optionally normalized with respect to the larger transition. More complex non-linear normalizations may be applied.

Case II: qj, and ri are both pauses: In this case pitch_error=0

Case III: Only one of qj, and ri is a pause: pitch_error=1

Case IV: If any of qj−1, and ri−1 is a pause, its parent's pitch is used in calculation and then one of the top three cases is used.

The tempo_error can be calculated using a number of techniques. One possible technique used in our technique is as follows:

$$\text{tempo\_error}=\text{abs}(\log 2[(di/di-1)(tj-1/tj)]) \qquad (Eq. 6)$$

Note how the error reduces to 0 as the ratio of the durations become more equal.

The quality of a match score can be improved by adding a history parameter M in the technique. In this embodiment, match scores are calculated based on a weighted score of the previous M matched parents. The parameter M is a design parameter. Higher values of M require higher processing power. However, higher values of M do not necessarily improve the performance. For example, in the case of an erroneous reference change, we do not want the error to keep propagating in the score calculation. Choice of M should therefore take into account factors such as human attention span, computing power available, the quality of the reference database, etc. The value of M in particular embodiments can be determined easily by those of skill in the art. The use of history parameters is thus helpful but not essential to the function of the method claimed herein.

$S_{VC}$=max(VERTICAL_CONS_SCORE(v)), v=1, 2, 3, . . . $V_{max}$

This step determines whether a higher score can be achieved by combining multiple notes in the query and matching them to a single note in the reference. This is iterated by merging two notes and recalculating the score, then three notes and recalculating the score and so on. The limit Vmax is a design parameter that depends on the application and the type of data as well as processing power available. When notes are combined, their durations are added. Their pitch can be either the pitch of the dominant note with the largest duration that is also not a pause, or the pitch_error can be calculated separately for each note that is being consolidated and weighted according to their duration. If the latter is used, the pitch_error for pauses is not accumulated.

$S_{HC}$=max(HORIZONTAL_CONS_SCORE(h)), h=1, 2, 3, ..., $H_{max}$

This step is identical to the vertical consolidation step described above, but it deals with the consolidation in the reference in the horizontal direction of table 2. All parameters are changed accordingly.

Pauses

As mentioned previously, most existing techniques remove pauses from the reference and the query before applying the matching technique. Pauses, however, may contain valuable information and can be used to improve the performance. Pauses are usually ignored either because it is difficult to deal with pauses since the transition into a pause or out of a pause is not well defined, or, in some cases, pauses are incorrectly detected and may exist in one of the strings (query or reference) but not the other.

The goal of the present method is to use pauses as a source of information if they do provide useful information, or ignore them without penalty if they do not provide any such information. Pauses in applications other than melody matching can also exist in the form of null nodes where one or more dimension of a node is missing a meaningful value. In melody, the duration dimension of a pause contains a valid value, whereas the pitch dimension does not.

The following steps are applied to deal with pauses:

Preprocessing: All strings (query and references) are preprocessed so that they do not start with a pause, and also there are no consecutive pauses.

All consecutive pauses are merged by adding their duration. In deletion, pauses can be deleted with no penalty (or reduced penalty).

When a pause is matched, the pitch dimension of its matching parent is propagated to it so that when this pause is being matched later to another note, the pitch information of its parents is used.

In calculating the pitch error in a substitution score, pauses are dealt with according to the four cases described above.

Alignment Determination

Once the score table is completed, the system determines the best alignment path, in step 260. Deletions on the first row are not penalized because the score is always changed to 0 as soon as it goes below 0. To make sure deletions in the reference after the alignment are not penalized, instead of finding the best path that ends in the node (m,n), we look for the final destination on the last row, which is the cell with the highest score. This ensures that the query has been entirely matched to any part of the reference. Once this destination node has been determined, it is traversed backward to determine the path that led to this node and resulted in the highest score. The result is the alignment table such as the one shown in Table 1.

At this level, the analysis is sufficient to determine whether a query matches a given reference sequence at a specified scoring level. If a given application does not require a ranked determination of the best match between a query and a set of reference sequences, this level of analysis will be sufficient.

In many applications, however, the ultimate goal is to find the best reference that matched the given query. The score obtained above may not be adequate for the purpose of sorting the references for best alignment, based on the following reasons:

Short memory: the alignment score is calculated as a first order where the matching score depends only on the parent node. If there is an error in one matched node, two transitions are affected, and therefore one error results in two penalties.

Deleting pauses and consolidating notes can result in a smaller maximum possible score for a given query-reference pair. If different pairs have different upper bounds on their maximum scores, comparing their final score is not a fair comparison.

Those problems are addressed in step 262, rescoring, in which several techniques are applied to improve the quality of the scoring. Rescoring is done in O(m) as opposed to the alignment which is done in O(m*n). In rescoring, transitions for each pair of notes less than Rescore_M (not necessarily equal to M) apart are scored and the score is accumulated. A maximum score for the given alignment table is also calculated, and the new score is reported as a percentage of the maximum score achieved for the given alignment table. This is a normalization process that ensures fair comparison among the new scores of all the query-reference pairs. The new score calculation may use a different set of parameters R, K, and M and the score of each transition is also weighed according to the duration of the nodes in each transition.

The new score is further normalized by penalizing for deleted nodes within the aligned segment of the reference. As mentioned before, nodes deleted before the aligned segment and after the aligned segment should not be penalized because the query can match to any part of the reference. However, the rescore does not take into account penalty for deleted nodes in the middle of the aligned segment of the reference. To accommodate for this, the new score is multiplied by the total duration of the reference notes in the aligned table, and divided by the total duration of the aligned segment minus the duration of the deleted pauses.

The system then iterates through each reference sequence, through decision block 264. Finally, the new scores are then used for sorting the reference strings and the highest score is reported as the best match for the given query, in step 266.

System Embodiment

Figure 8A:
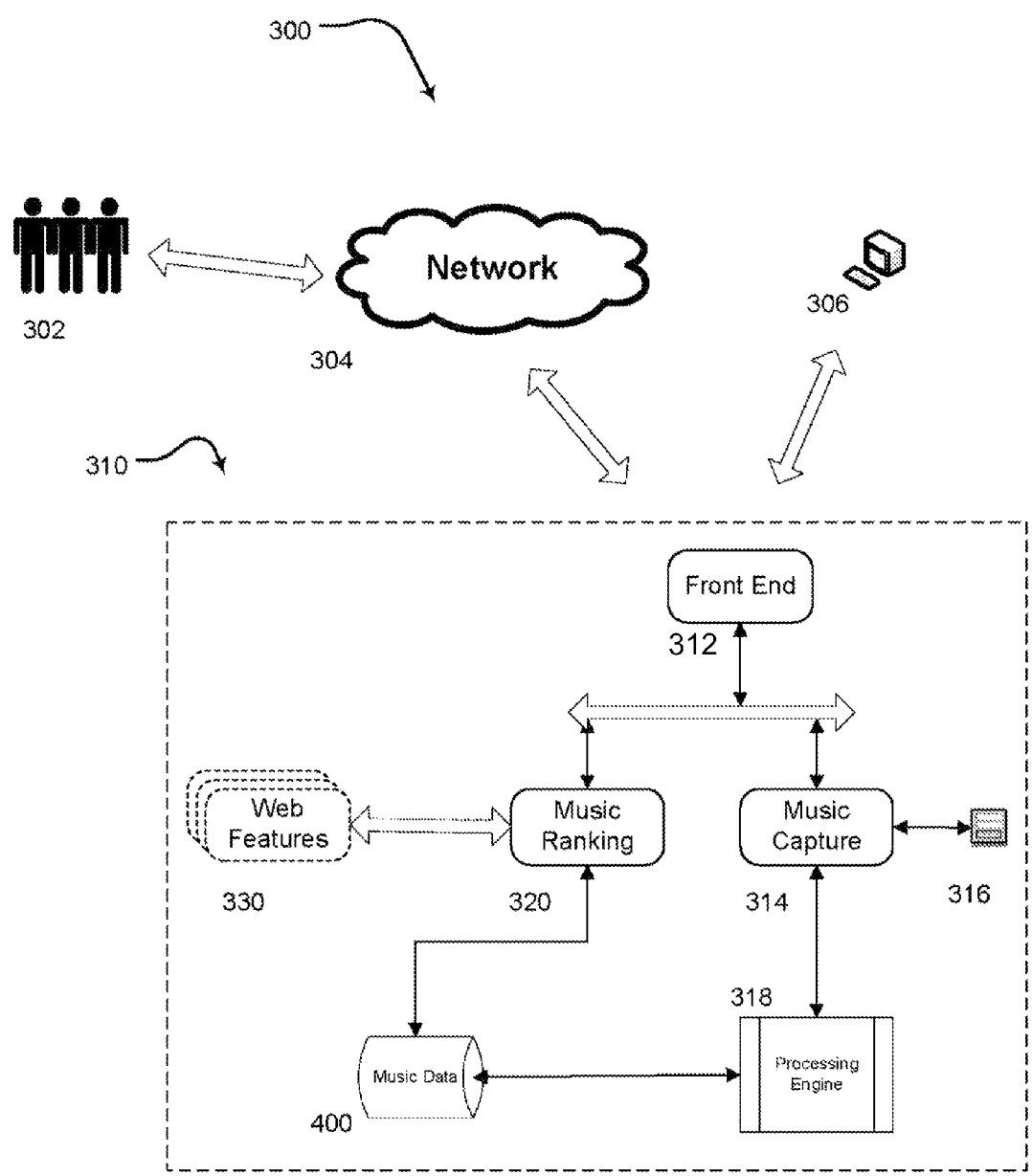
FIGS. 8a and 8b illustrates an embodiment of a process for building a database of stored music and retrieving stored music.
Figure 8B:
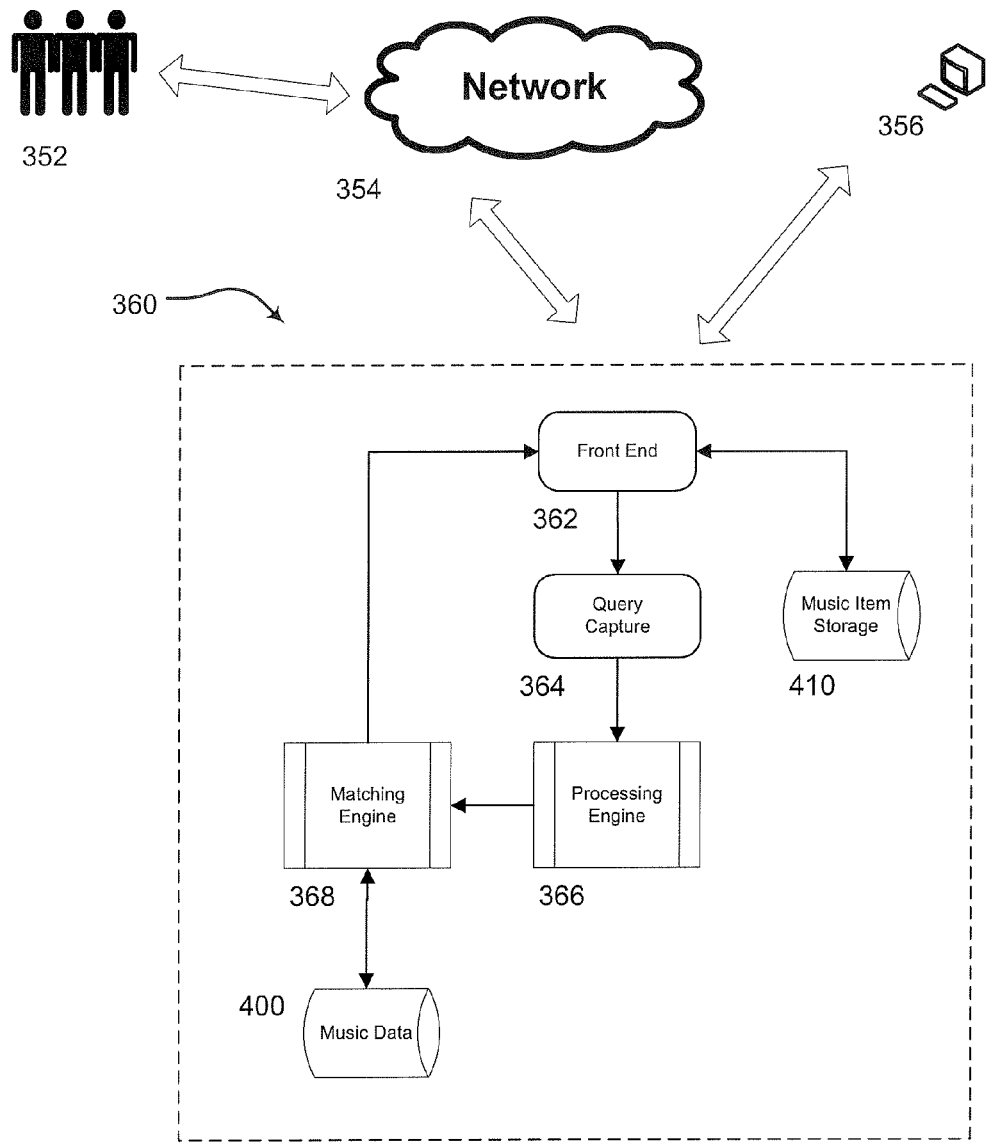

FIGS. 8a and 8b depict a specific embodiment of the invention claimed herein, in the form of a system 300 for identifying and delivering music items to a consumer. As will be made clear, the system 300 can be configured for individual environments, so that the entire system will be employed together, or each subsystem can be utilized in a standalone fashion.

Music delivery system 300 can best be visualized as two cooperating systems, a database input system 310 and a retrieval system 360. Considering first the input system, shown in FIG. 8a, users may access the system either directly or via a network, depending on the installation details. If the system is configured as part of a website, as discussed above, users 302 would access via a network 304, which in that example would be the internet. Other systems could be configured to operate on a closed network, such as, for example, as part of the entertainment system on a cruise ship.

Other users 306 can access the system directly, via a terminal or computer directly connected to the system. That type of access could be seen, for example, in a kiosk at a retail establishment or mall, where users could enter tags via system 310 and then retrieve music using system 360. Those in the art will understand that the access means and systems set out here are exemplary in nature. Over time, other access devices will become available, and such devices are fully incorporated here.

In either event, users interact with front end 310, which can be a graphical user interface (GUI). As with the access devices, those in the art will be able to devise the most effect form of interface device to fit a given installation or application. So long as that device performs the functions set out herein, it falls within the ambit of the present invention.

In either event, users interact with front end 312, which can be a graphical user interface (GUI). As with the access devices, those in the art will be able to devise the most effect form of interface device to fit a given installation or application. So long as that device performs the functions set out herein, it falls within the ambit of the present invention.

If the music capture module is chosen, the audio file is sent to the processing engine 316, which processes the audio data as discussed above. The resulting data record is forwarded to music data database 400 for storage. It should be noted that in embodiments in which subsystems 310 and 360 are deployed together, the music data database 400 is a single component, shared by the systems.

If a user chooses the music ranking module 320, the processing engine is not implicated, and the module interacts with the data records directly. Here, as set out above, the music tags are not altered.

Web features 330 include features designed to facilitate user mutual interaction and interest, as described above. Features aimed at improving system operation, such as webpages devoted to incentives or ringtone conversions, are combined with pages devoted to creating a music-based social network, for example. Such features are shown in dotted form to indicate that they are completely at the discretion of the system operator. An implementation of the system in a retail establishment, for example, would most likely not include such features, while a website may well push such features to the front of users' attention. Those of skill in the art will be able to employ such features to best advantage, while retaining the requisite focus on the technical features of the invention.

FIG. 8b illustrates the retrieval system 360. This system incorporates the data retrieval tasks described above and extends those tasks to add the steps required to place a desired music item in the hands of a consumer. As discussed above, users 352 can proceed via a network, such as the internet, or they can make direct access through devices such as 356. The latter device could easily be embodied as a terminal or kiosk in a music store, capable of overseeing the selection and sale of music.

Front end 362 manages user interaction with the system. This system may be combined with, or share functions with, front end 310 of FIG. 8a. Similarly, query capture module 364 can be co-incident with capture module 314 of FIG. 8a. Here, the user goes directly to that module from the front end, as there is no alternate functionality to follow.

Front end 362 manages user interaction with the system. This system may be combined with, or share functions with, front end 312 of FIG. 8a. Similarly, query capture module 364 can be co-incident with capture module 314 of FIG. 8a. Here, the user goes directly to that module from the front end, as there is no alternate functionality to follow.

The matching engine employs the item metadata (data 167, FIG. 5) to identify the music item to which the tag applies, and it forwards that information to the front end 362. If the user so desires, the front end can retrieve the music item itself from music item storage 410 and provide it directly to the user. In embodiments located in a retain establishment, the music storage database may provide inventory and location information for actual music items in the store, or optionally, the ability to special order the music item.

Other embodiments will not use a music item storage database within the system but will access such a system provided by a third party seller. In that manner, a small establishment can offer wide music availability without the expense of assembling a comprehensive music library.

Other Embodiments

Those in the art will understand that the sequence matching method disclosed and claimed herein can be applied in a number of environments. A particularly desirable embodiment would employ the method in a genetic sequencing system, in which the sequences to be matched are bases on a DNA chain, rather than notes in music. Another desirable embodiment would employ the method in speech recognition.

The present invention may be practiced as a method or device adapted to practice the method. The invention may be an article of manufacture such as media impressed with logic to carry out computer-assisted retrieval of non-text-based information.

While the present invention is disclosed by reference to the preferred embodiments and examples detailed above, it is understood that these examples are intended in an illustrative rather than in a limiting sense. It is contemplated that modifications and combinations will readily occur to those skilled in the art, which modifications and combinations will be within the spirit of the invention and the scope of the following claims.

We claim as follows:

1. A method of aligning elements in a query sequence and to elements in a target sequence, wherein the elements represent pitches with durations of an audio sequence, the method including:

representing potential element-to-element partial alignments between query and target sequences derived from audio sequences in an m-by-n cell data structure, such that cell (i,j) represents potential alignment of query element i with target element j;

forward propagating pitches and durations from cells included in partial alignments, for scoring purposes, into cells chosen to have a deleted element;

processing the cells in the data structure in an order that processes a particular cell after antecedent cells have been processed and scored;

choosing, cell-by-cell, whether element pair (i,j) of the query and target sequences should belong to a partial alignment or whether one element in the element pair (i,j) should be deleted, including considering at least potential transitions to (i,j)

from antecedent cell (i−1,j−1), representing potential inclusion of the element pair (i,j) in the partial alignment, from antecedent cell (i−1,j), representing potential deletion of an element from the query sequence, and from antecedent cell (i,j−1), representing potential deletion of an element from the target sequence;

scoring cumulative scores of the potential transitions, wherein scoring a cumulative score of the potential inclusion of the element pair (i,j) in the partial alignment includes adding a match score to a cumulative score of the previously scored cell (i−1,j−1), wherein calculating the match score includes using the pitches or propagated pitches of cell (i−1, j−1) and the pitches of cell (i,j) to calculate query pitch and target pitch differences, respectively, and using the durations or propagated durations of cell (i−1,j−1) the durations of cell (i,j) to calculate query duration and target duration ratios, respectively, then comparing the query and target pitch differences and comparing the query and target duration ratios to determine the match score;

scoring cumulative scores of the potential deletions from the query or target sequence includes subtracting a deletion penalty from the previously scored antecedent cell, either cell (i−1,j) for deletion of element i from the query sequence or cell (i,j−1) for deletion of element j from the target sequence;

selecting among the cumulative scores of the potential transitions and recording at least one selected transition and the cumulative score of the selected transition; and backtracking through the cumulative scores and the selected transitions, beginning with one or more high scores at one end of the query or target sequences to an opposite end and determining a total alignment, taking into account deletions, between the elements of the query and target sequences, and reporting for further processing at least the total alignment between the elements of the query and target sequences.

2. The method of claim 1, wherein the elements sometimes represent pauses, instead of pitches, further including forward propagating at least pitches, for scoring purposes, from cells included in the partial alignments into cells having pauses.

3. The method of claim 2, wherein the scoring of a potential inclusion transition into cell (i,j) as having a pitch difference of zero if elements i and j of the query and target sequences both include pauses.

4. The method of claim 1, wherein the elements sometimes represent pauses, instead of pitches, further including the scoring a potential inclusion transition into cell (i,j) as having a pitch difference of zero if elements i and j of the query and target sequences both include pauses.

5. The method of claim 1, further including considering potential transitions to (i,j) that involve consolidation and combine four cells in the partial alignment, wherein the potential transitions further include antecedent cell (i−2, j−1), representing potential consolidation of elements i−1 and i−2 from the query sequence, and antecedent cell (i−1, j−2), representing potential consolidation of elements j−1 and j−2 from the target sequence;

wherein scoring of the potential transitions involving consolidation selects either a dominant or weighted pitch of the consolidated elements and combines durations of consolidated elements, and scores transitions both from an antecedent cell into the cells representing the consolidated elements and from the cells representing the consolidated elements into cell (i,j), corresponding to partial alignment of four cells, two of which represent consolidated elements.

6. The method of claim 5, wherein consolidation of elements is limited to a predetermined number of consecutive elements in a sequence.

7. The method of claim 1, further including representing the pitches as notes within octaves, such that a notes in different octaves can have a pitch difference of zero.

8. The method of claim 1, repeatedly applied in a method of retrieving at least one target music item from a database of music items including music data, metadata and keys, the keys including target sequences, the method including:

capturing an audio input query from a user;

processing the audio query to generate a query sequence;

repeatedly applying the method of claim 1, using the query sequence and multiple target sequences, and reporting scores of the total alignments of the respective query and target sequence alignments;

using the scores, selecting at least one target music item as having the target sequence similar to the query sequence; and outputting at least an identification of the selected target music item or the selected target music data.

9. The method of claim 8, further including:

collecting human renditions of parts of songs; and populating the database of music items with one or more keys per song, wherein the target sequences are derived from the human renditions.

10. The method of claim 9, further including:

collect a human rendition of a query; and deriving the query sequence from the human rendition of the query.

11. A method of aligning elements in a query sequence and to elements in a target sequence, wherein the elements represent at least one attribute sampled from a physical source, the method including:

representing potential element-to-element partial alignments between the query and target sequences, sampled from the physical source, in an m-by-n cell data structure, such that cell (i,j) represents potential alignment of query element i with target element j;

forward propagating the attributes, for scoring purposes, from cells included in partial alignments into cells chosen to have a deleted element;

processing the cells in the data structure in an order that processes a particular cell after antecedent cells have been processed and scored;

choosing, cell-by-cell, whether element pair (i,j) of the query and target sequences should belong to a partial alignment or whether one element in the element pair (i,j) should be deleted, including considering at least potential transitions to (i,j)

from antecedent cell (i−1,j−1), representing potential inclusion of the element pair (i,j) in the partial alignment, from antecedent cell (i−1,j), representing potential deletion of an element from the query sequence, and from antecedent cell (i,j−1), representing potential deletion of an element from the target sequence;

scoring cumulative scores of the potential transitions, wherein scoring a cumulative score of the potential inclusion of the element pair (i,j) in the partial alignment includes adding a match score to a cumulative score of the previously scored cell (i−1,j−1), wherein calculating the match score includes using the attributes or propagated attributes of cell (i−1,j−1) and the attributes of cell (i,j), applying a transition measure to calculate query and target transition values, then comparing the query and target transition values to determine the match score;

scoring cumulative scores of the potential deletions from the query or target sequence includes subtracting a deletion penalty from the previously scored antecedent cell, either cell (i−1,j) for deletion of element i from the query sequence or cell (i,j−1) for deletion of element j from the target sequence;

selecting among the cumulative scores of the potential transitions and recording at least one selected transition and the cumulative score of the selected transition; and backtracking through the cumulative scores and the selected transitions, beginning with one or more high scores at one end of the query or target sequences to an opposite end and determining a total alignment, taking into account deletions, between the elements of the query and target sequences, and reporting for further processing at least the total alignment between the elements of the query and target sequences.

12. The method of claim 11, further including considering potential transitions to (i,j) that involve consolidation and combine four cells in the partial alignment, wherein the potential transitions further include antecedent cell (i−2, j−1), representing potential consolidation of elements i−1 and i−2 from the query sequence, and antecedent cell (i−1, j−2), representing potential consolidation of elements j−1 and j−2 from the target sequence;

wherein scoring of the potential transitions involving consolidation selects or combines attributes of consolidated elements, and scores transitions both from an antecedent cell into the cells representing the consolidated elements and from the cells representing the consolidated elements into cell (i,j), corresponding to partial alignment of four cells, two of which represent consolidated elements.

13. The method of claim 12, wherein consolidation of elements is limited to a predetermined number of consecutive elements in a sequence.

14. A method of aligning elements in a query sequence and to elements in a target sequence, wherein the elements represent at least one attribute representing a physical characteristic, the method including:

representing potential element-to-element partial alignments between the query and target sequences in an m-by-n cell data structure, such that cell (i,j) represents potential alignment of query element i with target element j;

forward propagating the attributes, for scoring purposes, from cells included in partial alignments into cells chosen to have a deleted element;

processing the cells in the data structure in an order that processes a particular cell after antecedent cells have been processed to have a recorded selected transition and cumulative score;

choosing, cell-by-cell, whether element pair (i,j) of the query and target sequences should belong to a partial alignment or whether one element in the element pair (i,j) should be deleted, including scoring cumulative scores of potential transitions between antecedent cells and the cell (i,j), wherein scoring a cumulative score of potential inclusion of the element pair (i,j) in the partial alignment includes adding a match score to previously scored cell (i−1,j−1), wherein calculating the match score includes using the attributes or propagated attributes of cell (i−1,j−1) and the attributes of cell (i,j), applying a transition measure to calculate query and target transition values, then comparing the query and target transition values to determine the match score;

scoring cumulative scores of the potential deletions from the query or target sequence includes subtracting a deletion penalty from a previously scored antecedent cell, either cell (i−1,j) for deletion of element i from the query sequence or cell (i,j−1) for deletion of element j from the target sequence;

selecting among the cumulative scores of the potential transitions and recording at least one selected transition and the cumulative score of the selected transition; and backtracking through the cumulative scores and the selected transitions, beginning with one or more high scores at one end of the query or target sequences to an opposite end and determining a total alignment, taking into account deletions, between the elements of the query and target sequences, and reporting for further processing at least the total alignment between the elements of the query and target sequences.

15. The method of claim 14, further including considering potential transitions to (i,j) that involve consolidation and combine four cells in the partial alignment, wherein the potential transitions further include antecedent cell (i−2, j−1), representing potential consolidation of elements i−1 and i−2 from the query sequence, and antecedent cell (i−1, j−2), representing potential consolidation of elements j−1 and j−2 from the target sequence;

wherein scoring of the potential transitions involving consolidation selects or combines attributes of consolidated elements, and scores transitions both from an antecedent cell into the cells representing the consolidated elements and from the cells representing the consolidated elements into cell (i,j), corresponding to partial alignment of four cells, two of which represent consolidated elements.

16. The method of claim 15, wherein consolidation of elements is limited to a predetermined number of consecutive elements in the query and/or target sequence.

* * * * *